US 6,525,714 B1

(12) United States Patent
Varga et al.

(10) Patent No.: US 6,525,714 B1
(45) Date of Patent: Feb. 25, 2003

(54) POINTING DEVICE WITH AN ANNULAR ROTATING RING

(75) Inventors: Donald G. Varga, San Francisco, CA (US); Nigel G. Taylor, Maple Ridge (CA); Mark A. Edwards, San Francisco, CA (US); James C. N. Chan, Richmond (CA); Ben Roberts, White Rock (CA); John Cavacuiti, Vancouver (CA)

(73) Assignee: Acco Brands, Inc., Lincolnshire, IL (US)

( * ) Notice: Subject to any disclaimer, the term of this patent is extended or adjusted under 35 U.S.C. 154(b) by 110 days.

(21) Appl. No.: 09/710,152

(22) Filed: Nov. 9, 2000

Related U.S. Application Data (60) Provisional application No. 60/165,057, filed on Nov. 12, 1999.

(51) Int. Cl.[7] .................................................. G09G 5/00
(52) U.S. Cl. .................... 345/164; 345/157; 345/167
(58) Field of Search .......................... 345/157, 163–164, 345/167, 184; 200/5 R, 6 A; 273/148 B; 74/471 XY; D14/402–410; 463/36, 39

(56) References Cited

U.S. PATENT DOCUMENTS

| 4,933,670 | A | | 6/1990 | Wislocki | 345/167 |
| 5,489,922 | A | * | 2/1996 | Zloof | 345/156 |
| 5,541,621 | A | | 7/1996 | Nmngani | 345/167 |
| 5,543,821 | A | | 8/1996 | Marchis et al. | 345/167 |
| 5,561,445 | A | * | 10/1996 | Miwa et al. | 345/163 |
| 5,565,891 | A | * | 10/1996 | Armstrong | 345/167 |
| D431,037 | S | * | 10/2000 | Varga et al. | D14/409 |

FOREIGN PATENT DOCUMENTS

| DE | 3824393 C1 | 7/1989 |
| WO | PCT/US00/30957 | 11/2000 |

* cited by examiner

Primary Examiner—Richard Hjerpe
Assistant Examiner—Francis Nguyen
(74) Attorney, Agent, or Firm—Townsend and Townsend and Crew LLP (57) ABSTRACT

The present invention pertains to a computer pointing device having an annular rotating ring that is rotatable by a user to control the movement of a cursor on a computer screen. The annular rotating ring is preferably implemented around a trackball to facilitate the ease of use by the user. The annular rotating ring is made up of three constituent rings, namely, a finger ring, a bearing ring, and a shutter ring. The three constituent rings are constructed in such a way that they are interlocked to eliminate any unnecessary movement or slop during use.

31 Claims, 13 Drawing Sheets

POINTING DEVICE WITH AN ANNULAR ROTATING RING

This application claims the benefit of priority under 35 U.S.C. Section 119 from U.S. Provisional Application No. 60/165,057, filed Nov. 12, 1999, the disclosure of which is incorporated by reference in its entirety for all purposes.

BACKGROUND OF THE INVENTION

The present invention generally relates to pointing or cursor-controlling computer peripheral devices. More particularly, the present invention relates to an annular rotating ring for use with a trackball or other pointing device for a computer.

A rotating ring, if implemented and constructed correctly, offers a number of advantages to a user. For example, a rotating ring may enable a user to precisely control the vertical directional movement of a cursor on a computer screen. However, the rotation of a rotating ring may generate a certain amount of slop, i.e., undesired movement in any direction or axis, which in turn affect the user's ability to precisely position a cursor at a specific location on a computer screen.

Furthermore, it is also important that the ease of use by a user is taken into consideration. Since the rotating ring is incorporated into a pointing device and thus is used as part of an interface to the computer, the level of convenience of use is often crucial to the viability of the pointing device as a commercial product.

SUMMARY OF THE INVENTION

The present invention pertains to a computer pointing device having an annular rotating ring that is rotatable by a user to control the movement of a cursor on a computer screen. The ring is easy to control (allowing precise movement) and is easy to use and to maintain. The annular ring is preferably implemented around a trackball to facilitate the ease of use by the user. In an exemplary embodiment, the annular ring is made up of three constituent rings, namely, a finger ring, a bearing ring, and a shutter ring. The three constituent rings are constructed in such a way that they are interlocked to reduce any unnecessary movement or slop during use. More specifically, the shutter ring includes a number of receptacles and notches which are used to respectively engage the interlocking arms from the bearing ring and the hooks from the finger ring.

Using multiple (e.g., three) constituent rings to make up the rotating ring provides a number of advantages. For example, having three separate constituent rings facilitates the manufacturing and assembly process of the rotating ring. In addition, the three disengageable constituent rings permit the pointing device to be maintained and cleaned relatively easily thereby prolonging the lifespan of the pointing device.

Furthermore, the bottom surface of the shutter ring includes a number of saw-toothed features which are used to provide tactile feedback to a user so as to allow the user to have a better feel for the degree of movement when the user rotates the annular ring. Additional signal transfer mechanisms are provided to capture and transfer the signals represented by the rotation of the annular ring. As will be described in further details below, the present invention provides a rotating ring which significantly reduces slop and satisfies other needs as well.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DESCRIPTION OF THE SPECIFIC EMBODIMENTS

The present invention pertains to a computer peripheral device. In particular, the present invention pertains to a computer pointing device having an annular rotating ring 50 that is rotatable by a user to control an element of the computing system, (e.g., the movement of a cursor on a computer screen). Annular ring 50 is preferably implemented around the ball of a trackball to facilitate the ease of use by the user.

Figure 1:
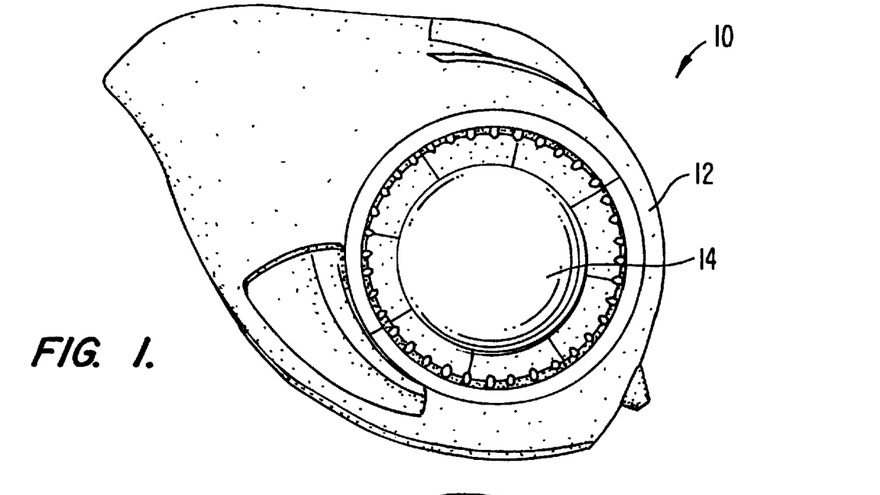
FIG. 1 is a top plan view of an embodiment of the present invention.
Figure 2:
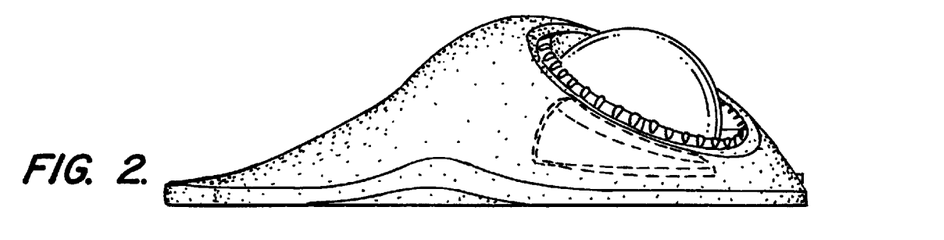
FIG. 2 is a left side elevational view of the embodiment of the present invention as shown in FIG. 1.
Figure 3:
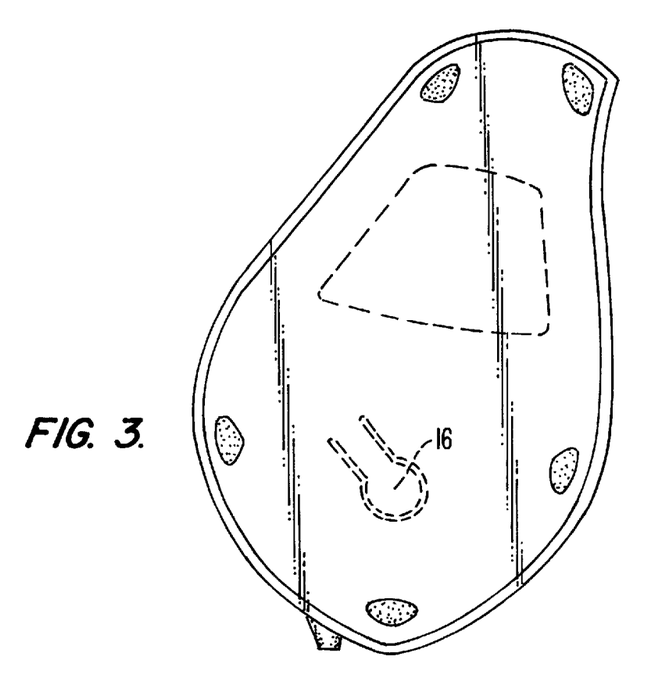
FIG. 3 is a bottom elevational view of the embodiment of the present invention as shown in FIG. 1.

FIG. 1 is a top plan view of an embodiment of the present invention and FIG. 2 is a left side elevational view of the embodiment of the present invention shown in FIG. 1. FIG. 1 shows a pointing device 10 in accordance with the present invention. The pointing device 10 is a trackball. Pointing device 10 includes a housing 12 and a rotatable ball 14. Housing 12 has an opening 13 to accommodate rotatable ball 14. In its normal position, at least half of rotatable ball 14 is generally located beneath the imaginary plane defined by opening 13. FIG. 3 is a bottom elevational view of the embodiment of the present invention shown in FIG. 1. As shown in FIG. 3, a button 16 is located on the bottom of housing 12 which may be pushed to dislodge rotatable ball 14 and a part of annular ring 50 from their respective normal positions. The dislodging mechanics will be further described below.

Figure 4:
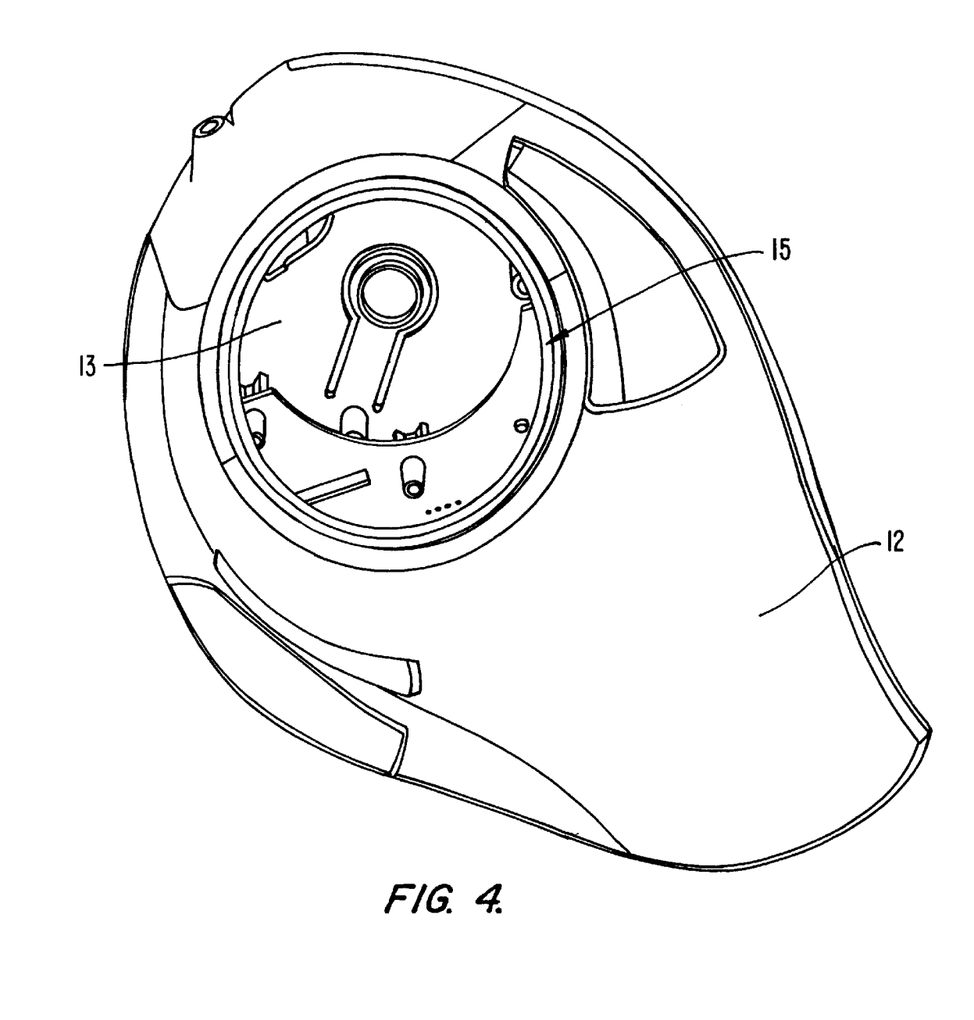
FIG. 4 is a perspective view of the embodiment of the present invention as shown in FIG. 1 showing various openings in the housing.

FIG. 4 is a perspective view of the embodiment of the present invention shown in FIG. 1 showing the opening 13 in housing 12. As shown in FIG. 4, a rim 15 or a flat surface is formed around the periphery of the opening. In a preferred embodiment, the rim 15 is integrally formed with housing 12.

Figure 5:
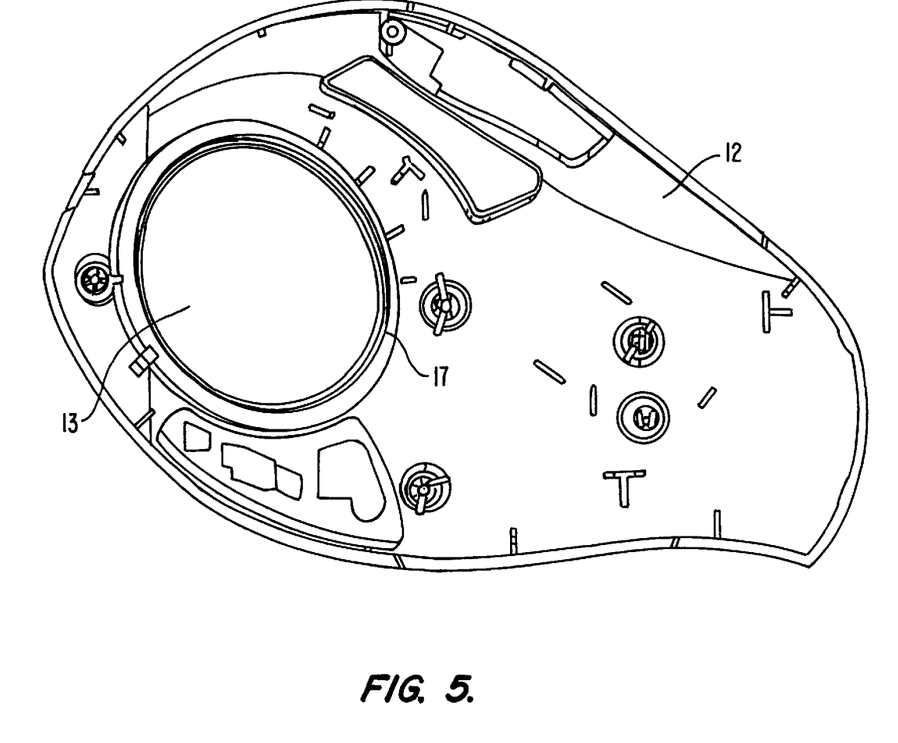
FIG. 5 is a perspective view of the interior of the top portion of the housing in accordance with the present invention.

FIG. 5 is a perspective view of the interior of housing 12 in accordance with the present invention. On the bottom surface of rim 15 is a circular groove 17. The circular groove 17 engages annular ring 50 thereby reducing slop when a user rotates annular ring 50. The function of the circular groove 17 will be further explained below.

Figure 6:
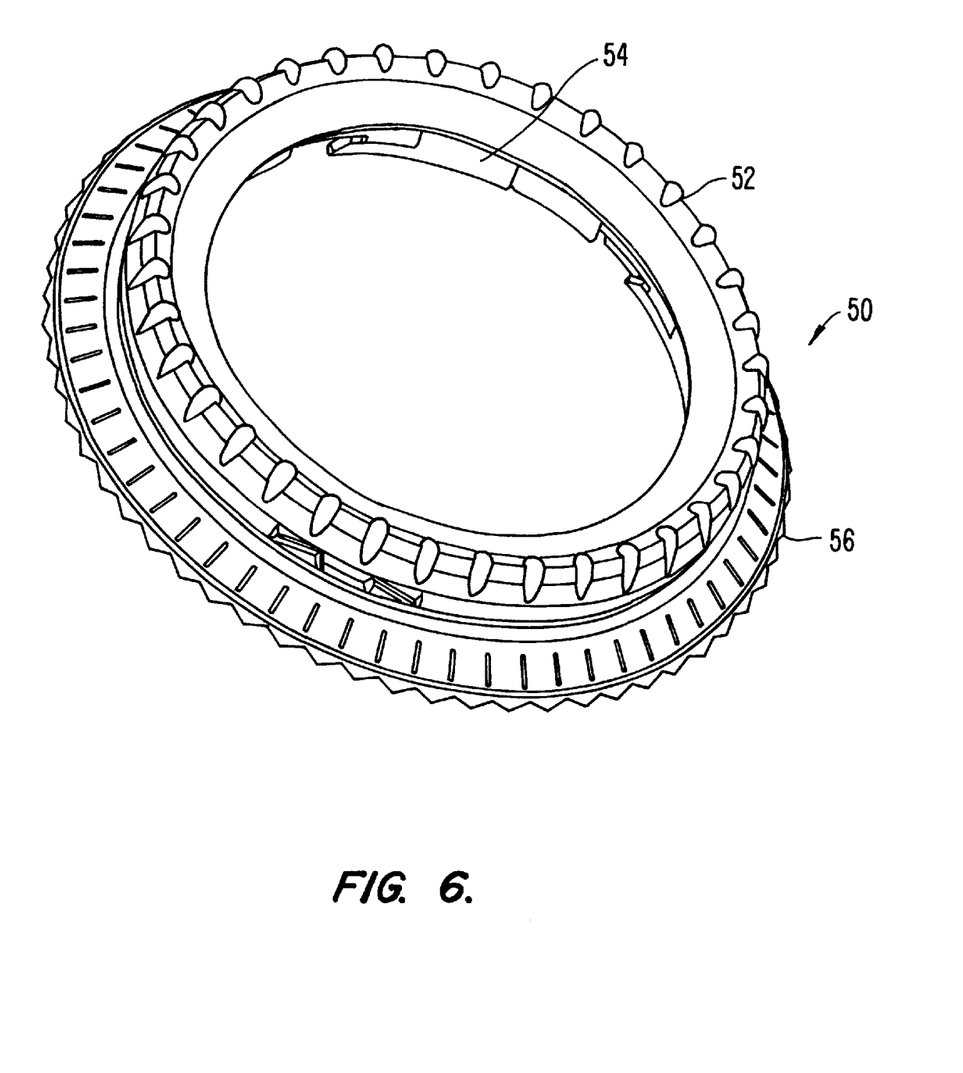
FIG. 6 is perspective view of the annular ring shown in accordance with one embodiment of the present invention.

FIG. 6 is a perspective view of annular ring 50 shown in accordance with one embodiment of the present invention. In this embodiment, annular ring 50 generally includes three constituent rings, namely, a finger ring 52, a bearing ring 54 and a shutter ring 56. These three constituent rings 52, 54, 56 are assembled to form the annular ring 50. More specifically, the three constituent rings 52, 54, 56 interlock against one another thereby forming the annular ring 50, which the user collectively rotates.

Figure 7:
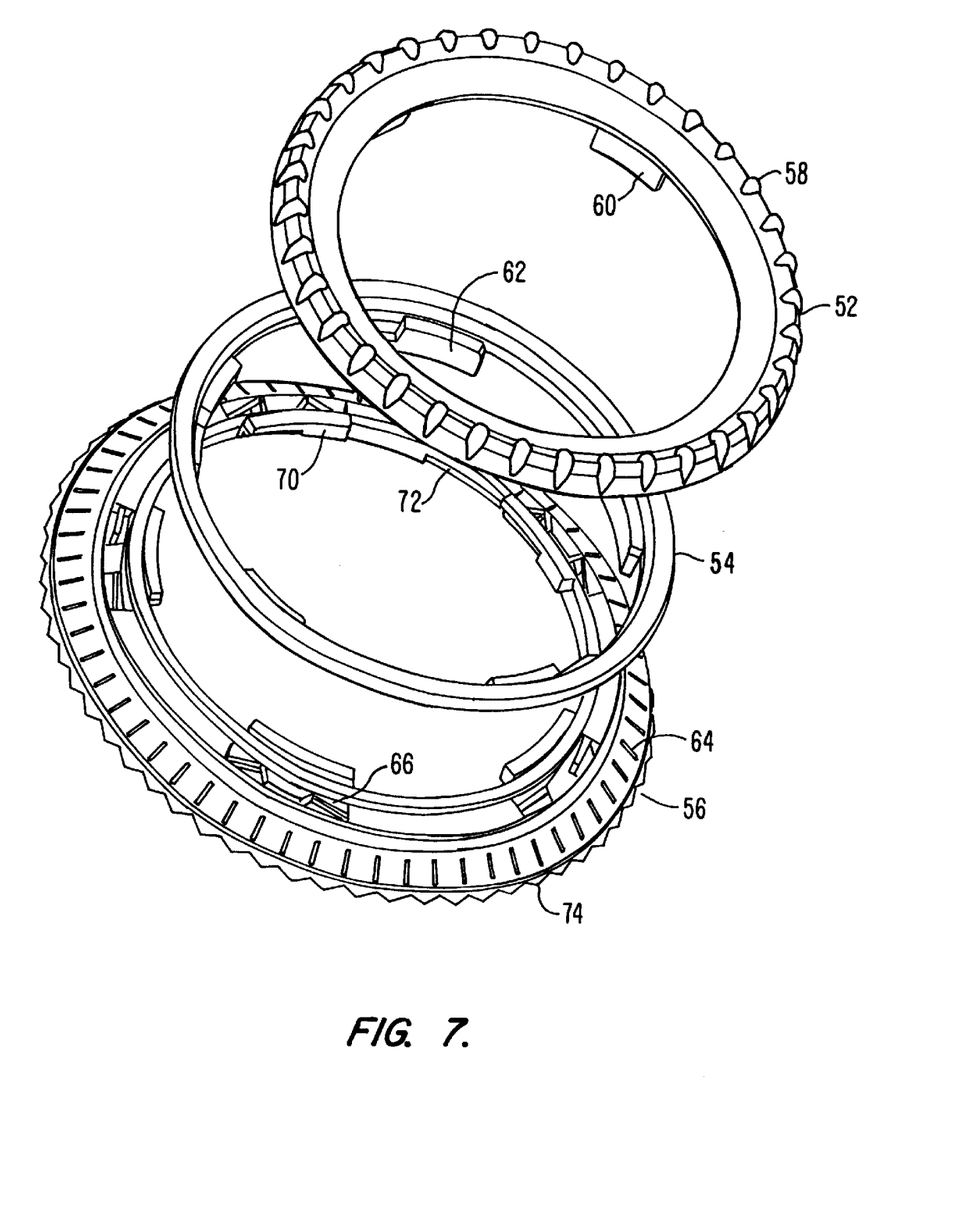
FIG. 7 is an exploded perspective view of the disassembled annular ring showing its three constituent rings in accordance with one embodiment of the present invention.

FIG. 7 is an exploded perspective view of disassembled annular ring 50 as shown in FIG. 5 showing the three constituent rings 52, 54, 56. Finger ring 52 is made of elastic materials. The elasticity of finger ring 52 provides the ability to bend and snap and plays an important role in disassembling annular ring 50, as will be explained later. A user makes contact with finger ring 52 to control the rotation of annular ring 50.

Circumferentially located on the top surface of finger ring 52 are a number of bumps 58. In a preferred embodiment, bumps 58 are integrally formed with finger ring 52. Bumps 58 are intended to provide an improved grip and cushion so as to allow the user to rotate finger ring 52 more smoothly and easily. Furthermore, bumps 58 are designed in such a way that when a user places his/her fingers on finger ring 52 to rotate annular ring 50, the fingers are caused to be positioned so as not to accidentally turn rotatable ball 14. Bumps 58 are preferably made of rubberized material or hard plastic so as to provide a more tangible tactile feel.

The bottom surface of finger ring 52 has a number of extensions. In a preferred embodiment, these extensions are hooks 60 which are integrally formed on the bottom surface of finger ring 52. Hooks 60 are located circumferentially along the bottom surface of finger ring 52. The inner diameter of finger ring 52 is designed in such a way that it is smaller than the diameter of rotatable ball 14. As will be more fully explained below, by having a relatively smaller inner diameter, finger ring 52 is easily removable for cleaning or maintenance.

Bearing ring 54 is made of a low friction and elastic material. Since the bottom surface of bearing ring 54 is the surface that makes contact with the rim of the opening, the use of a low friction material allows annular ring 50 to be rotated smoothly during use. When rotating annular ring 50, the largest amount of friction is generated on the bottom surface of bearing ring 54. Therefore, it is advantageous to make bearing ring 54 using a low friction material. Furthermore, the inner diameter of bearing ring 54 is larger than that of rotatable ball 14.

Bearing ring 54 has a number of interlocking arms 62. In a preferred embodiment, interlocking arms 62 are integrally formed with bearing ring 54. Interlocking arms 62 are located in a circumferential manner on the bottom of bearing ring 54 along its inner periphery.

Shutter ring 56 is also made of elastic materials. The inner diameter of shutter ring 56 is larger than that of rotatable ball 14. Located on the top surface of shutter ring 56 are slits 64 that function as a shutter and aperture system for a couple of optical switches 80. When shutter ring 56 is rotated, slits 64 generate certain optical signals which optical switches 80 capture and then transfer to a control circuit 88. Preferably, two optical switches are used to decode both the magnitude and direction of rotation. In order to determine the magnitude of rotation, the control circuit 88 counts the number of switch transitions. In order to decode the direction, the optical switches 80 are placed at a distance equal to one half the width of slit 64 or optical slot. The control circuitry 88 senses the order of transition for the two optical switches 80 and determines the direction of movement. Once the magnitude and direction of rotation is determined, the movement of the cursor on the computer screen is actuated accordingly. As will be described below, a number of alternative mechanisms can be used to capture the rotational data generated by shutter ring 56.

Shutter ring 56 has a number of springs 66. In a preferred embodiment, springs 66 are integrally formed with shutter ring 56. As will be explained later, springs 66 bear against the underside of housing 12, in particular, the circular groove 17 on the bottom surface of the rim 15, to provide further control to a user when rotating annular ring 50. Springs 66 also reduce slop, i.e., unwanted movement in any axis, in annular ring 50 radially and axially along the curved shape of the circular groove 17 in housing 12. Springs 66 are formed so that in its natural state, i.e., with shutter ring 56 not engaged to housing 12, they are partially outside of the circular groove 17 when the centers of shutter ring 56 and the opening 13 are lined up. With this construction, when shutter ring 56 is pushed to engage housing 12, springs 66 are forced into the circular groove 17 creating tension against the surface of the circular groove 17 thereby pushing shutter ring 56, together with finger and bearing rings 52, 54 when assembled, inward. Since springs 66 all exert roughly equal force along the circular groove 17, annular ring 50 is forced into a centered position. In addition, springs 66 also exert a downward force which aids in the smooth movement of annular ring 50.

Shutter ring 56 also has a number of interlocking receptacles 70. In a preferred embodiment, receptacles 70 are integrally formed with shutter ring 56. Receptacles 70 are circumferentially located along the inner periphery of shutter ring 56. Each of receptacles 70 and each interlocking arm 62 located along the inner periphery of bearing ring 54 are capable of disassembly engaging each other in a complementary manner forming an interlocking mechanism that keeps bearing ring 54 and shutter ring 56 together. Preferably, the total number of receptacles 70 corresponds to that of interlocking arms 62.

Shutter ring 56 further has a number of notches 72. In a preferred embodiment, notches 72 are integrally formed along the inner periphery of shutter ring 56. The function of notches 72 is to engage hooks 60 from finger ring 52 thereby securing finger ring 52 to shutter ring 56. In addition, by sandwiching bearing ring 54 between finger ring 52 and shutter ring 56, interlocked interlocking arms 62 and receptacles 70 are further secured. Preferably, the number of notches 72 is the same as the number of hooks 60.

Figure 8:
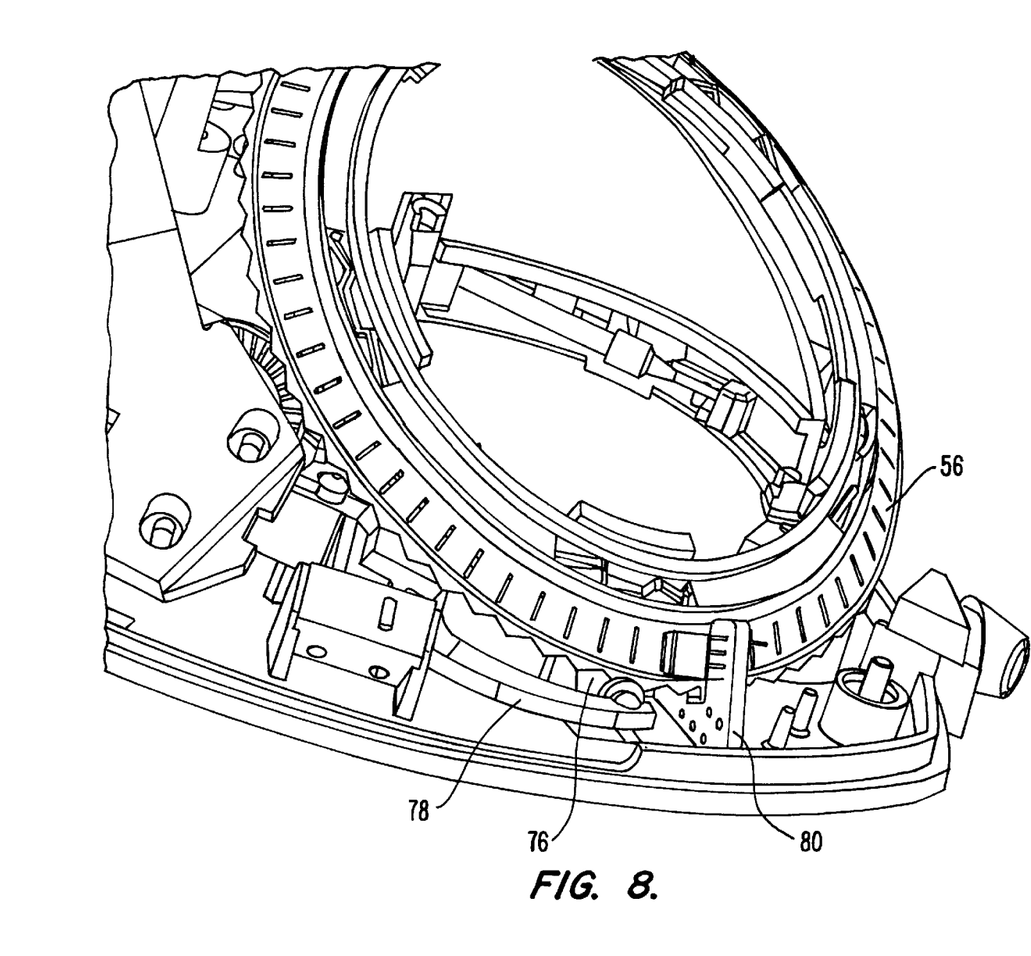
FIG. 8 is a perspective view of an embodiment of the present invention shown without the top half of the housing.
Figure 9:
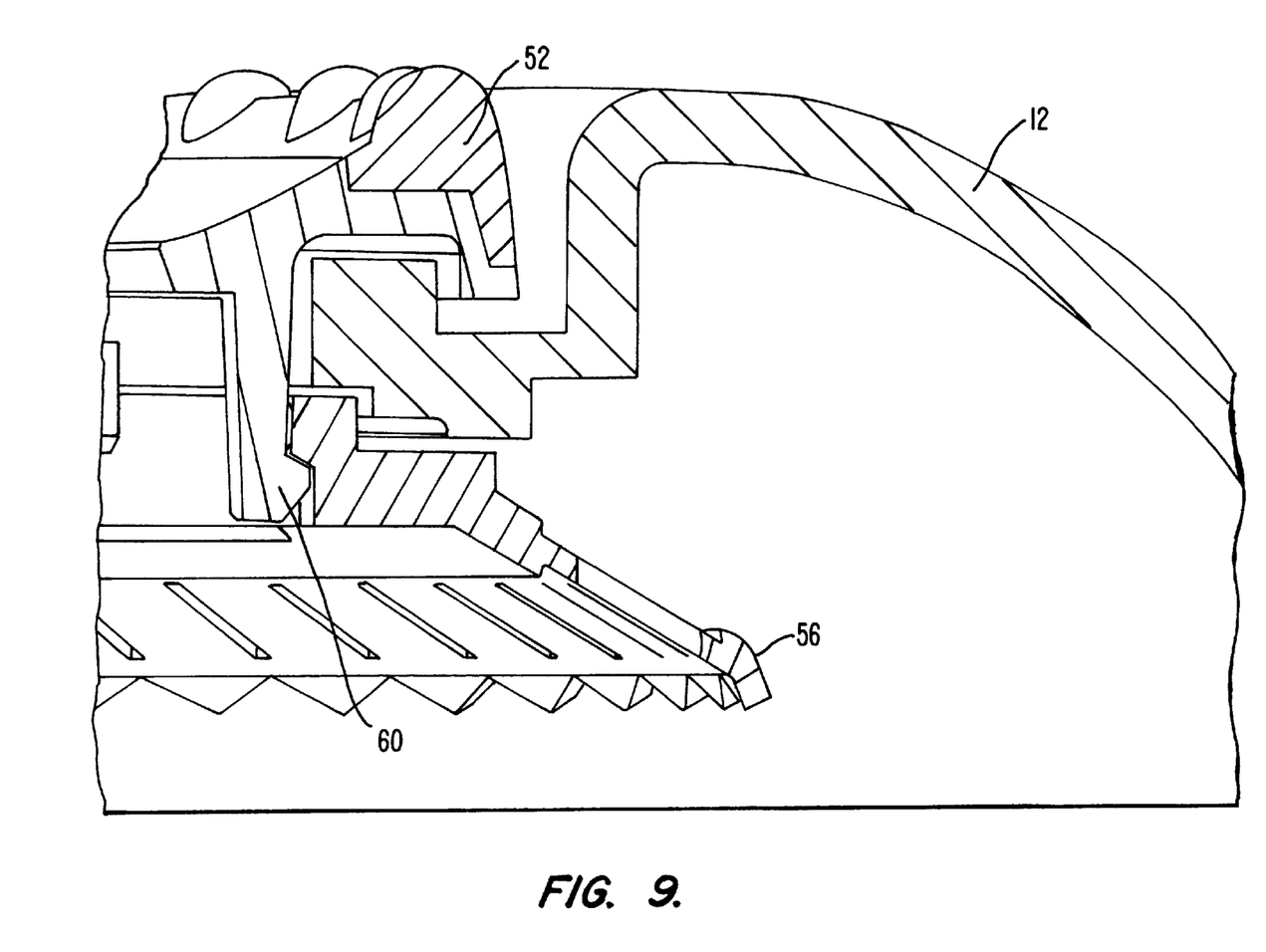
FIG. 9 is a cross-sectional view of an embodiment of the present invention showing a hook of the finger ring engaging a notch of the shutter ring.

In addition, shutter ring 56 has a number of teeth 74 located on its bottom surface in a circumferential manner. In a preferred embodiment, teeth 74 are integrally formed in a saw-toothed manner on the bottom surface of shutter ring 56. FIG. 8 is a perspective view of an embodiment of the present invention shown without the top half of housing 12. As shown in FIG. 8, a rubber covered roller 76 is extendibly attached to a cantilever spring arm 78 to engage teeth 74. When a user rotates shutter ring 56, teeth 74 roll over rubber covered roller 76 causing rubber covered roller 76 to extend and retract. Since shutter ring 56 is rotated at an angle by the user, the extending and retracting movement of rubber covered roller 76 provides a more precise feel and control of rotation to the user. By having teeth 74 configured in a saw-toothed fashion, shutter ring 56 naturally comes into a stable position with roller 76 resting in between two adjacent teeth 74 when annular ring 50 is at rest or not rotated.

Furthermore, with shutter ring 56 in its resting position, slits 64 are configured such that no slit is positioned directly on top of optical switch 80. The foregoing configuration prevents erroneous data capture when annular ring 50 is at rest.

Finger ring 52, bearing ring 54, and shutter ring 56 are assembled in the following manner to form annular ring 50. When shutter ring 56 is pressed against the bottom surface of the lip, springs 66 are forced into the circular groove 17. Preferably, springs 66 are the only portion of shutter ring 56 that is in contact with the bottom surface of the lip. Bearing ring 54 is then inserted into the opening from the top with the bottom surface of bearing ring 54 resting against the top surface of the lip. Bearing ring 54 is then turned in such a way that interlocking arms 62 engage receptacles 70 of shutter ring 56. Interlocked interlocking arms 62 and receptacles 70 and the tension in springs 66 therefore secure bearing ring 54 and shutter ring 56 in their respective positions with the rim sandwiched therebetween. Rotatable ball 14 is then deposited into the opening. Next, finger ring 52 is inserted on top of bearing ring 54. Since finger ring 52 and hooks 60 are made of elastic materials, hooks 60 flex and hook onto notches 72 thereby securing all three rings 52, 54, 56 together. FIG. 8 is a cross-sectional view of the an embodiment of the present invention showing a hook 60 of finger ring 52 engaging a notch 72 of shutter ring 56. Preferably, receptacles 70, interlocking arms 62 and hooks 60 are proportioned in such a way that they are snugly aligned against one another thereby further preventing separate movement by any one individual ring when a user rotates annular ring 50. Interlocked in the foregoing manner, all three rings 52, 54, 56 can now be collectively rotated by the user to control the movement of the cursor on a computer screen.

It should be understood that while annular ring 50 is identified as having three constituent rings 52, 54, 56, these rings 52, 54, 56 do not have to be physically separate. In other words, three rings 52, 54, 56 can be integrally molded together to form annular ring 50. Alternatively, any combinations of two of three rings 52, 54, 56 can also be integrally molded together and be engageably attached to the remaining ring to form annular ring 50.

Rotatable ball 14 and three rings 52, 54, 56 can be disassembled for cleaning or maintenance in a very simple manner. As shown in FIG. 3, located on the bottom of housing 12 is button 16 or a lever that a user may push to dislodge rotatable ball 14. When the user pushes button 16 to force rotatable ball 14 out of its normal position, rotatable ball 14 is pressed up against the inner periphery of finger ring 52. Since finger ring 52 is circular, the pressure exerted on the inner periphery is roughly equal at all points. Due to the elastic nature of finger ring 52, the pressure exerted on the inner periphery causes finger ring 52 to flex thereby disengaging hooks 60 from notches 72 located along the inner periphery of shutter ring 56. Finger ring 52 and rotatable ball 14 may then be removed while shutter ring 56 and bearing ring 54 remain interlocked and engaged to housing 12.

Figure 10:
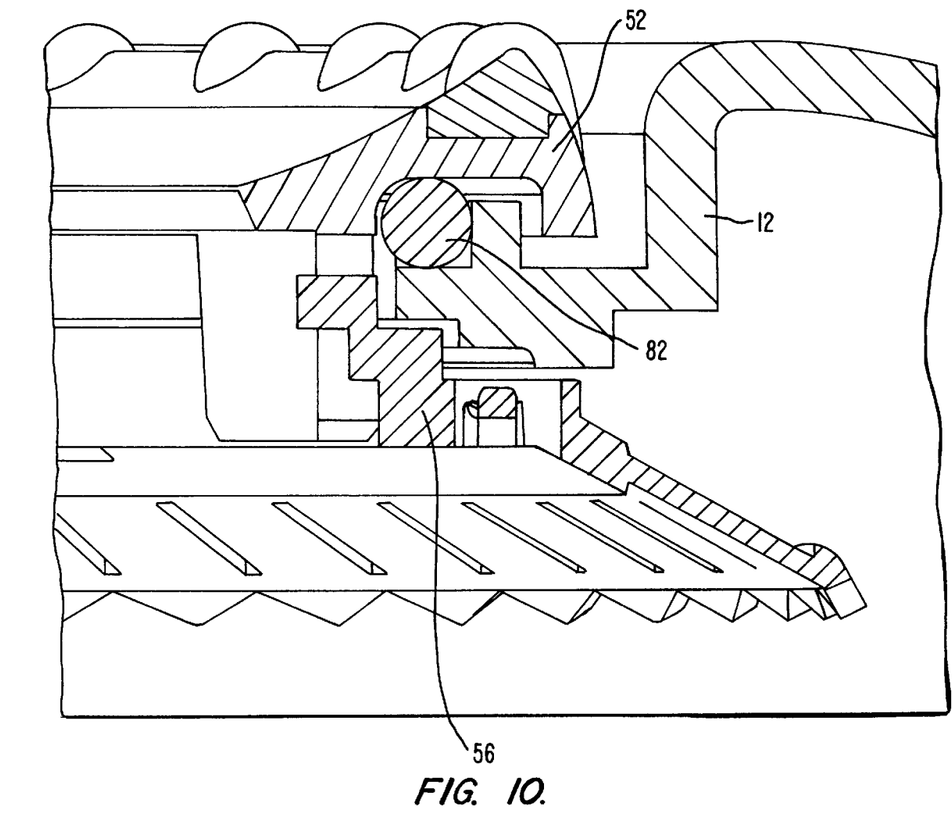
FIG. 10 is a cross-sectional view of an embodiment of the present invention showing the use of bearings in lieu of a bearing ring.

In an alternate embodiment, bearing ring 54 is replaced entirely and finger ring 52 is modified to include a flat bottom surface. Spherical rubies 82 are added onto the top surface of the rim acting as bearings against the bottom surface of finger ring 52. Finger ring 52 is inserted on top of spherical rubies 82. Hooks 60 similarly engage notches 72 to secure finger ring 52 to shutter ring 56. FIG. 10 is a cross-sectional view of an embodiment of the present invention showing the use of rubies 82 in lieu of bearing ring 54.

In another alternate embodiment (not shown), bearing ring 54 is replaced entirely and finger ring 52 is modified to include a flat bottom surface. The flat bottom surface of finger ring 52 is lubricated and bears against the top surface of the lip. Hooks 60 similarly engage notches 72 to secure finger ring 52 to shutter ring 56.

In yet another alternate embodiment (not shown), spherical rubies or hard bearing points are deposited on the top surface of the rim to further reduce friction generated by the bottom surface of bearing ring 54 when a user rotates annular ring 50. Each ruby is deposited in such a way that at least a portion of its surface is above the top surface of the lip. The rubies act as bearings reducing the area of contact between the rim and the bottom surface of bearing ring 54. Consequently, a reduced area of contact results in less friction during rotation. Other hard materials such as steel may also be used as bearings in place of the rubies. By using rubies and such other hard materials, the level of wear and tear may be reduced.

Figure 11:
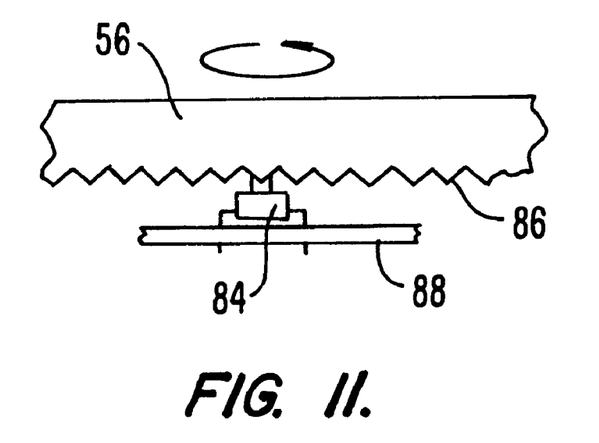
FIG. 11 is a simplified schematic diagram showing one embodiment of the signal transfer mechanism in accordance with the present invention.
Figure 12:
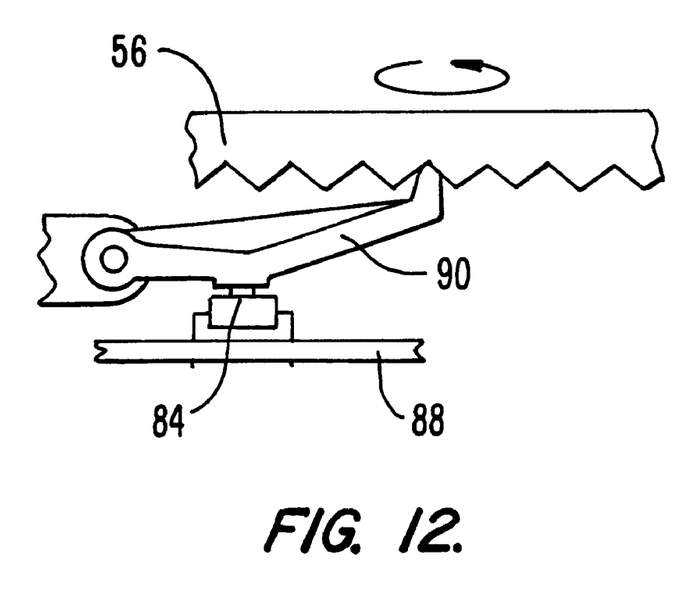
FIG. 12 is a simplified schematic diagram showing a second embodiment of the signal transfer mechanism in accordance with the present invention.

The signals generated by the rotation of annular ring 50 are captured and transferred in a number of ways. In one embodiment as shown in FIG. 11, the bottom surface of shutter ring 56 is equipped with a suitably shaped trigger feature or linkage mechanism 86, such as a sawtooth, which is capable of acting upon a microswitch 84. Hence, whenever annular ring 50 is rotated, shutter ring 56 directly triggers microswitch 84. Microswitch 84, in turn, is coupled to a control circuit 88 which relays the signals to produce the corresponding cursor movement on the computer screen. In the sawtooth embodiment, the switches are placed at one-quarter the width of a sawtooth, or an odd multiple thereof, in order to decode the direction of rotation as well. In an alternate embodiment as shown in FIG. 12, the triggering action is transferred through a lever arm 90 to a remotely positioned microswitch 84.

Figure 15:
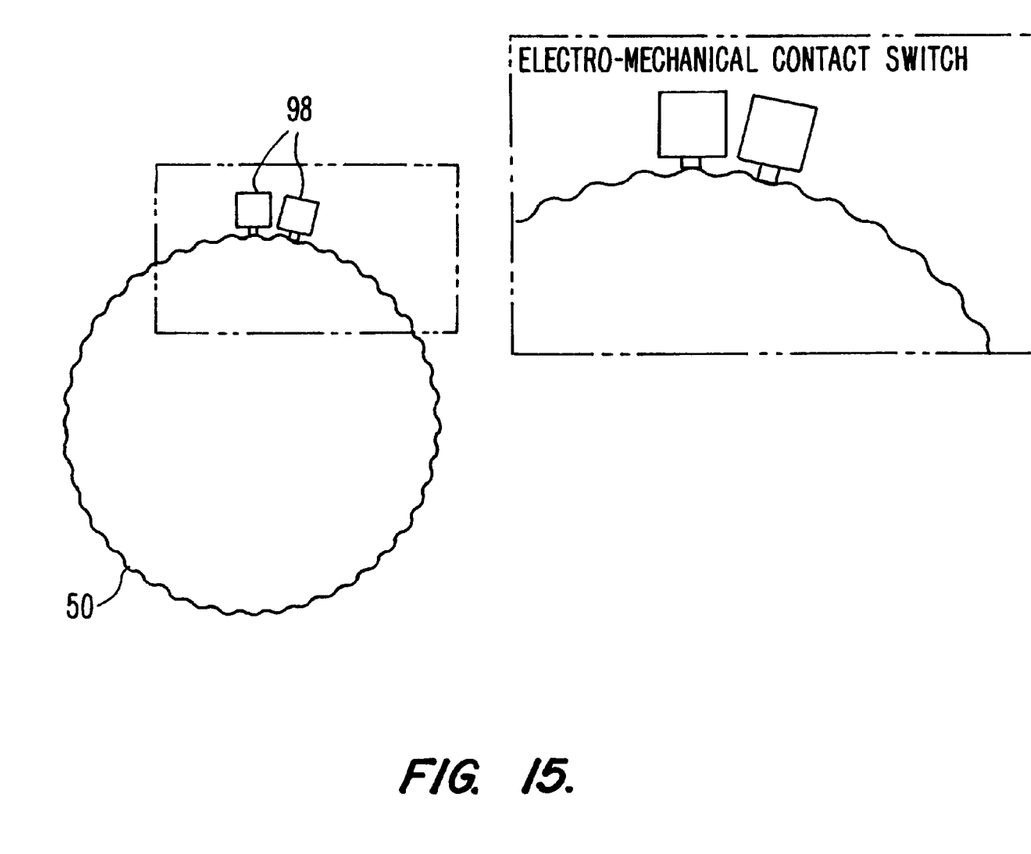
FIG. 15 is a simplified schematic diagram showing two electromechanical switches in cooperation with an annular rotating ring of the present invention.

In another embodiment, as shown in FIG. 15, a couple of electro-mechanical switches 98 are used to detect movement of the shutter ring 56. Preferably, the two electron-mechanical switches 98 are set out of phase by 90 degrees.

Figure 16:
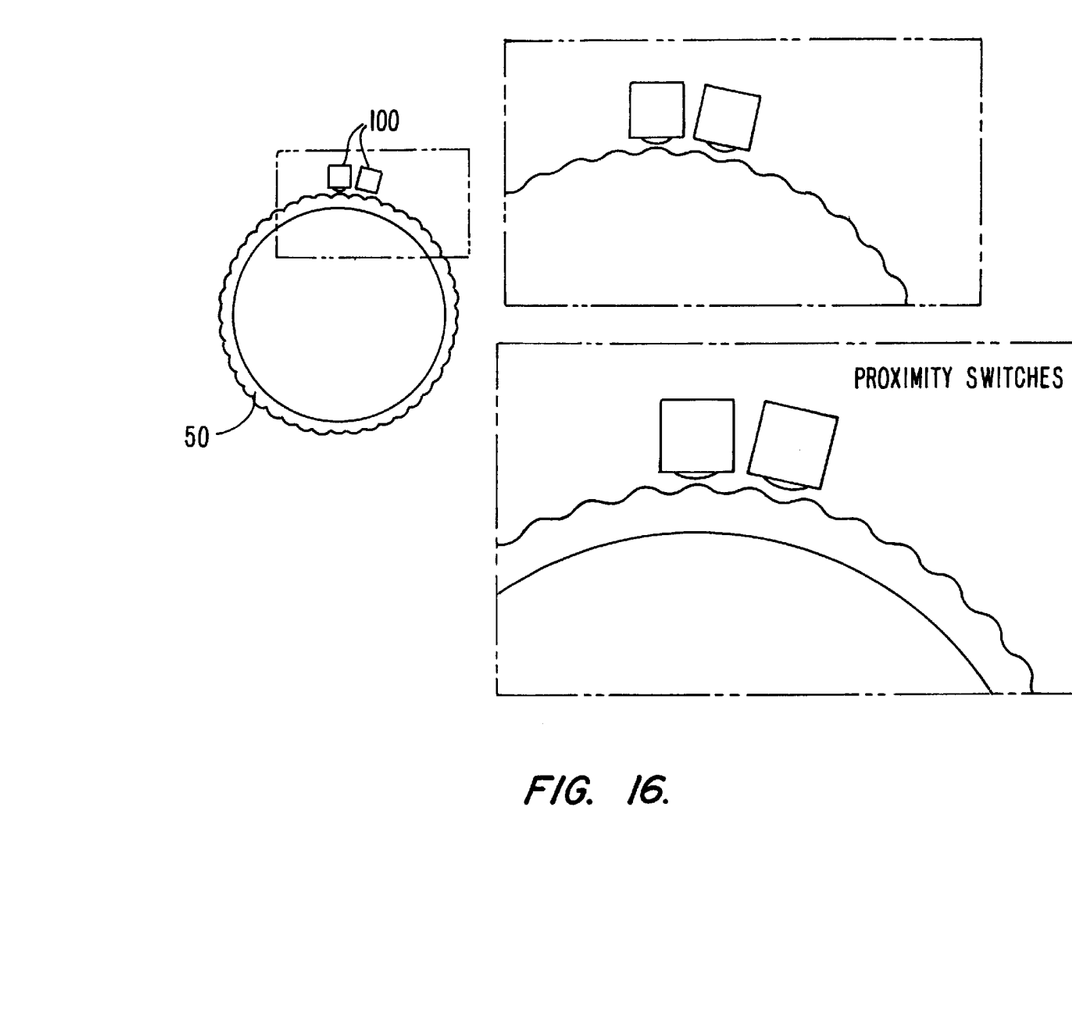
FIG. 16 is a simplified schematic diagram showing two proximity switches in cooperation with an annular rotating ring of the present invention.

In yet another embodiment, as shown in FIG. 16, a couple of proximity switches 100 are used to detect movement of shutter ring 56. Instead of physical contact, movement of a permanent magnet (not shown) to within a threshold range of the proximity switches 100 triggers the switches 100 thereby allowing rotational data to be sensed and captured. More specifically, the magnet is moved up and down via a lever arm. As the magnet gets within a certain distance, the proximity switches 100 are triggered and a control circuit (not shown) then uses the trigger to decode the rotation.

Figure 13:
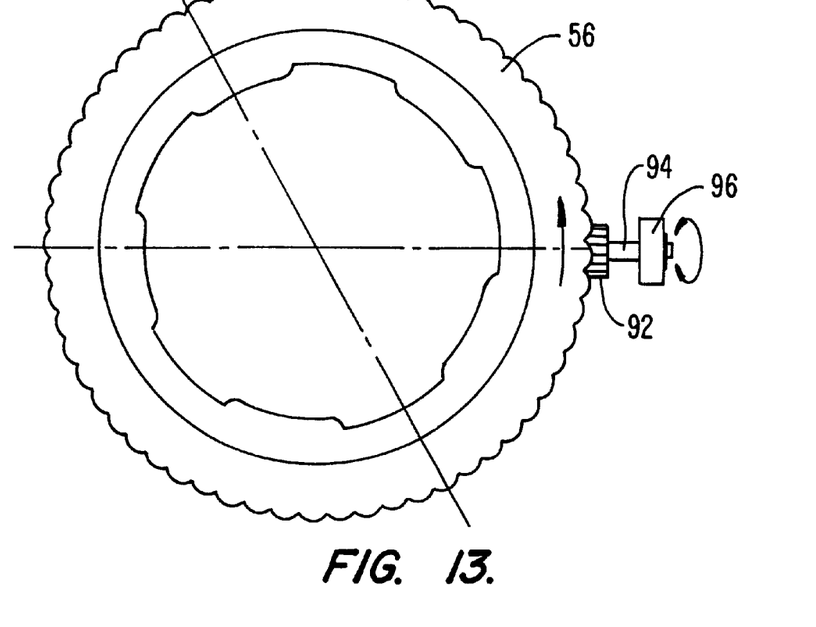
FIG. 13 is a simplified schematic diagram showing a third embodiment of the signal transfer mechanism in accordance with the present invention.

In still another alternate embodiment as shown in FIG. 13, shutter ring 56 engages a driver gear 92 or other similar equivalent means of power transfer, e.g., a friction roller. Attached to driver gear 92 is a shaft 94 that engages a set of rotary switches 96 at one end.

Figure 17:
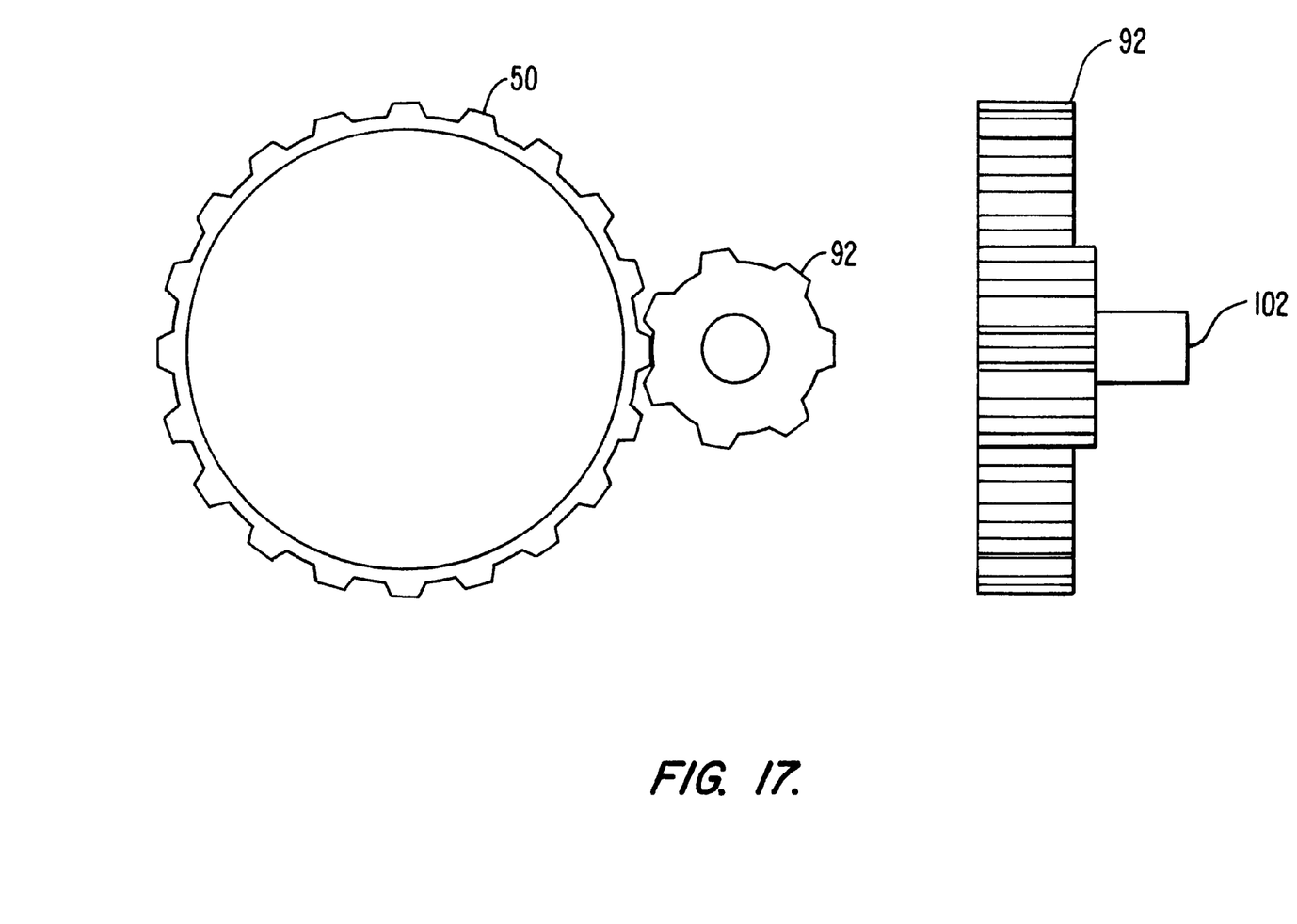
FIG. 17 is a simplified schematic diagram showing a potentiometer in cooperation with an annular rotating ring of the present invention.

In addition, instead of a digital signal, driver gear 92 as shown in FIG. 17 is used to drive a potentiometer 102. The potentiometer 102 does not have any physical stops and is active through a full 360 degrees. The varying resistance is sensed by an analog to digital converter mechanism implemented by a control circuit. The resulting digital signal represents the angle of rotation of the rotating ring 50.

Figure 14:
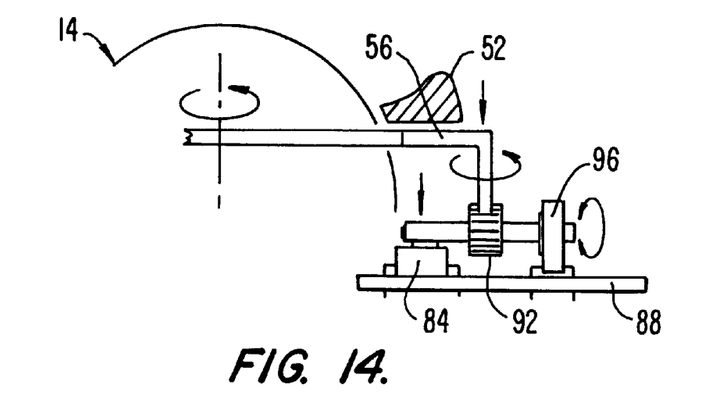
FIG. 14 is a simplified schematic diagram showing a fourth embodiment of the signal transfer mechanism in accordance with the present invention.

As FIG. 14 further illustrates, located at the other end is a microswitch 88 which is actuated by depressing annular ring 50. The ability to use annular ring 50 to depress microswitch 84 might be achieved by implementing a modification to the various elements disclosed herein.

The various embodiments described above employ a microswitch for sensing switch contact. It should be understood that any type of mechanical switch activated by the sawtooth or a geared mechanism can also be used to decode the rotation. For example, the sawtooth itself could be conductive and the teeth contacting metallic posts make the switch contact. Again, spacing of ¼ of the sawtooth width, or an odd multiple, is preferred to decode direction.

It is understood that the examples and embodiments described herein are or illustrative purposes only and that various modifications or changes in light thereof will be suggested to persons skilled in the art and are to be included within the spirit and purview of this application and scope of the appended claims.

What is claimed is:

1. An annular rotating ring for use with a computer pointing device having an opening defined by a rim, comprising:
   a first ring;
   a second ring; and
   a plurality of extensions for integrally coupling said first ring to said second ring;
   wherein said rim is sandwiched between said first ring and said second ring; and
   wherein said annular rotating ring is capable of being used to detect magnitude and direction of rotation.

2. An annular rotating ring for use with a computer pointing device having an opening with a rim, comprising:
   a first ring having a first plurality of extensions;
   a second ring having a second plurality of extensions; and
   a third ring;
   wherein said first plurality of extensions is integrally coupled to said third ring, and said second plurality of extensions is integrally coupled to said third ring, thereby integrally forming said annular rotating ring; and
   wherein said annular rotating ring is configured to be secured along said rim.

3. An annular rotating ring for use with a computer peripheral device having an opening with a rim, comprising:
   a first ring having a plurality of extensions;
   a second ring having a plurality of arms; and
   a third ring having a plurality of notches for engaging said plurality of extensions and a plurality of receptacles for engaging said plurality of arms;
   wherein said annular rotating ring is configured to be secured along said rim.

4. The annular rotating ring according to claim 3, wherein said extensions are hooks.

5. The annular rotating ring according to claim 3, wherein said first ring is made from an elastic material.

6. The annular rotating ring according to claim 3, wherein said second ring is made from a low friction material.

7. The annular rotating ring according to claim 3, wherein said third ring is made from an elastic material.

8. The annular rotating ring according to claim 3, wherein said third ring includes a plurality of slits integrally formed therein.

9. The annular rotating ring according to claim 3, wherein said third ring includes a plurality of teeth.

10. The annular rotating ring according to claim 3, wherein said third ring includes a plurality of springs integrally formed therein.

11. The annular rotating ring according to claim 3, wherein said first ring includes a plurality of bumps located on top of said finger ring.

12. The annular rotating ring according to claim 3, wherein said computer peripheral device includes a rotatable ball; and
   wherein said annular rotating ring is fitted around said rotatable ball.

13. A computer peripheral device having an annular rotating ring, comprising:
   a housing having an opening to accommodate a rotatable ball;
   a rim integrally formed around a periphery of said opening, said rim having a bottom surface, and said bottom surface of said rim having a circular groove residing therein;
   said annular rotating ring comprising:
      a finger ring having a plurality of hooks;
      a bearing ring having a plurality of interlocking arms; and
      a shutter ring having a plurality of springs for engaging said circular groove, a plurality of notches for engaging said plurality of hooks, and a plurality of receptacles for engaging said plurality of interlocking arms;
   wherein said annular rotating ring is engaged to said housing by positioning said rim in between said bearing ring and said shutter ring; and
   wherein said annular rotating ring is fitted around said rotatable ball.

14. The computer peripheral device according to claim 13, wherein said shutter ring further includes a plurality of slits integrally formed therein.

15. The computer peripheral device according to claim 14, wherein said plurality of slits are configured to provide signals to a plurality of optical switches.

16. The computer peripheral device according to claim 13, wherein said shutter ring further includes a linkage mechanism formed on bottom thereof to engage a signal transfer mechanism.

17. The computer peripheral device according to claim 13, wherein said linkage mechanism is a plurality of teeth.

18. The computer peripheral device according to claim 17, wherein said plurality of teeth are configured in a saw-toothed fashion to engage a roller.

19. The computer peripheral device according to claim 17, wherein said plurality of teeth are configured in a saw-toothed fashion to engage a signal transfer mechanism.

20. The computer peripheral device according to claim 16, wherein said signal transfer mechanism is a microswitch.

21. The computer peripheral device according to claim 16, wherein said signal transfer mechanism is a plurality of electromechanical switches.

22. The computer peripheral device according to claim 16, wherein said signal transfer mechanism is a proximity switch.

23. The computer peripheral device according to claim 16, wherein said signal transfer mechanism is a potentiometer; and wherein said annular rotating ring is coupled to said potentiometer via said linkage mechanism.

24. The computer peripheral device according to claim 19, wherein said signal transfer mechanism is a mechanical switch.

25. The computer peripheral device according to claim 13, wherein said finger ring further includes a plurality of bumps formed on a top surface of said finger ring.

26. The computer peripheral device according to claim 13, wherein said rim further includes a top surface having a plurality of bearings partially disposed therein.

27. The computer peripheral device according to claim 26, wherein said plurality of bearings include rubies.

28. A computer peripheral device having an annular rotating ring, comprising:
- a housing having an opening to accommodate a rotatable ball;
- a rim formed around a periphery of said opening, said rim having a top surface and a bottom surface, said top surface having a plurality of bearings partially embedded therein and said bottom surface of said rim having a circular groove residing therein;
- said annular rotating ring comprising:
  - a finger ring having a bottom surface, said bottom surface of said finger ring having a plurality of hooks; and
  - a shutter ring having a plurality of springs capable of engaging said circular groove and a plurality of notches capable of engaging said plurality of hooks;
- wherein said bottom surface of said finger ring makes contact with said plurality of bearings to facilitate rotation of said annular rotating ring; and
- wherein said annular rotating ring is fitted around said rotatable ball.

29. A computer peripheral device having an annular rotating ring, comprising:
- a housing having an opening to accommodate a rotatable ball;
- a rim integrally formed around a periphery of said opening, said rim having a bottom surface, and said bottom surface of said rim having a circular groove residing therein;
- said annular rotating ring comprising:
  - a first ring means;
  - a second ring means;
  - a third ring means;
  - a first engaging means for engaging said first ring means to said third ring means;
  - a second engaging means for engaging said second ring means to said third ring means;
- wherein said annular rotating ring is engaged to said housing by positioning said rim in between said second ring means and said third ring means; and
- wherein said annular rotating ring is fitted around said rotatable ball.

30. A computer peripheral device having an annular rotating ring, comprising:
- a housing having an opening to accommodate a rotatable ball;
- a rim integrally formed around a periphery of said opening, said rim having a bottom surface, and said bottom surface of said rim having a circular groove residing therein;
- said annular rotating ring comprising:
  - a finger ring having a plurality of hooks;
  - a bearing ring having a plurality of interlocking arms; and
  - a shutter ring having a plurality of springs for engaging said circular groove, a plurality of notches for engaging said plurality of hooks, and a plurality of receptacles for engaging said plurality of interlocking arms;
- wherein said annular rotating ring is engaged to said housing by positioning said rim in between said bearing ring and said shutter ring;
- wherein said annular rotating ring is fitted around said rotatable ball;
- wherein said finger ring is located above said bearing ring; and
- wherein said bearing ring is located above said shutter ring.

31. A method for implementing an annular rotating ring for use with a computer peripheral device, said computer peripheral device having an opening to accommodate a rotatable ball and a rim integrally formed around a periphery of said opening, said rim having a bottom surface, said bottom surface of said rim having a circular groove residing therein, said annular rotating ring including a finger ring, a bearing ring, and a shutter ring, said method comprising:
- engaging a plurality of springs of said shutter ring with said circular groove;
- placing said bearing ring on top of said lip;
- engaging a plurality of interlocking arms of said bearing ring with a plurality of receptacles of said shutter ring;
- placing said rotatable ball into said opening;
- placing said finger ring on top of said bearing ring; and
- engaging a plurality of hooks of said finger ring with a plurality of notches of said shutter ring.

* * * * *